United States Patent
Fujiwara et al.

(10) Patent No.: US 9,833,945 B2
(45) Date of Patent: Dec. 5, 2017

(54) COMPOSITE MATERIAL STRUCTURE FORMING METHOD

(75) Inventors: Naoaki Fujiwara, Tokyo (JP); Tadashi Yazaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 13/876,012

(22) PCT Filed: Jan. 13, 2012

(86) PCT No.: PCT/JP2012/050613
§ 371 (c)(1),
(2), (4) Date: Mar. 26, 2013

(87) PCT Pub. No.: WO2012/132497
PCT Pub. Date: Oct. 4, 2012

(65) Prior Publication Data
US 2013/0199709 A1    Aug. 8, 2013

(30) Foreign Application Priority Data
Mar. 28, 2011   (JP) .................................. 2011-070605

(51) Int. Cl.
*B29C 65/02*   (2006.01)
*B29C 70/46*   (2006.01)
(Continued)

(52) U.S. Cl.
CPC ............ *B29C 65/02* (2013.01); *B29C 70/345* (2013.01); *B29C 70/462* (2013.01); *B29C 43/18* (2013.01)

(58) Field of Classification Search
CPC ..... B29C 70/446; B29C 70/30; B29C 33/485; B29C 66/721; B29C 70/46; B29C 70/543;
(Continued)

(56) References Cited

U.S. PATENT DOCUMENTS 4,169,749 A * 10/1979 Clark .................. B29C 33/0016
                                                                156/156
4,298,417 A * 11/1981 Euler et al. .................... 156/228
(Continued)

FOREIGN PATENT DOCUMENTS

| DE | 100 11 879 | 9/2001 |
| GB | 2 040 790 | 9/1980 |

(Continued)

OTHER PUBLICATIONS

International Search Report dated Feb. 21, 2012 in International (PCT) Application No. PCT/JP2012/050613.
(Continued)

*Primary Examiner* — Jacob T Minskey
*Assistant Examiner* — Vishal I Patel
(74) *Attorney, Agent, or Firm* — Wenderoth, Lind & Ponack, L.L.P.

(57) ABSTRACT

A composite material structure forming method capable of improving the shape and dimensional accuracy inside a composite material structure. The method includes: winding a prepreg (2) around an inner jig (6); stacking a ply (8) on the prepreg (2) wound around the inner jig (6); and forming a composite material structure by providing composite outer plates (4a, 4b) on an outer periphery of the inner jig (6) on which the ply (8) is stacked and mounting divided outer jigs (9) thereon.

6 Claims, 3 Drawing Sheets

(51) Int. Cl.
*B29C 70/34* (2006.01)
*B29C 43/18* (2006.01)

(58) Field of Classification Search
CPC ..... B29C 70/48; B29C 70/465; B29C 70/546; B29C 65/5021; B29C 65/5028; B29C 33/38; B29C 43/18; B29C 70/467; B29C 2605/18; B29C 70/462; B29C 70/345; B29C 65/02
USPC ......... 156/196, 189, 242, 184, 86, 245, 173, 156/191, 185, 283, 285
See application file for complete search history.

(56) References Cited

U.S. PATENT DOCUMENTS

| | | | | |
|---|---|---|---|---|
| 4,650,534 | A | * | 3/1987 | Mussi et al. ................... 156/245 |
| 4,657,615 | A | * | 4/1987 | Braun et al. ................... 156/245 |
| 5,125,993 | A | * | 6/1992 | Principe ................... B29C 70/34 |
| | | | | 156/155 |
| 5,755,558 | A | | 5/1998 | Reinfelder et al. |
| 2005/0042109 | A1 | | 2/2005 | Kovalsky et al. |

FOREIGN PATENT DOCUMENTS

| | | |
|---|---|---|
| JP | 50-16298 | 2/1975 |
| JP | 58-56823 | 4/1983 |
| JP | 60-166593 | 8/1985 |
| JP | 4-235004 | 8/1992 |
| JP | 3631493 | 3/2005 |
| JP | 2007-503533 | 2/2007 |

OTHER PUBLICATIONS

Patent Cooperation Treaty (PCT) Written Opinion of the International Searching Authority dated Feb. 21, 2012 in International (PCT) Application No. PCT/JP2012/050613.

Extended European Search Report dated Nov. 6, 2014 in corresponding European patent application No. 12763405.3.

Decision to Grant a Patent dated Mar. 24, 2015 in corresponding Japanese patent application No. 2011-070605.

* cited by examiner

COMPOSITE MATERIAL STRUCTURE FORMING METHOD

BACKGROUND OF THE INVENTION

1. Technical Field

The present invention relates to a composite material structure forming method.

2. Description of the Related Art

A structure made of a composite material such as a fiber-reinforced plastic (FRP) is widely used as a high-strength lightweight structure, for example, in an aircraft and a windmill. Such a composite material structure is generally formed by heating and pressurizing a prepreg in an autoclave.

When a composite material structure is formed by heating and pressurizing a prepreg in an autoclave, a jig is provided on one surface of the composite material structure to be formed, and thus a variation occurs in shape and dimension of a side on which the jig is not provided. In particular, the dimensional accuracy of an outer periphery of a hollow object such as an aircraft wing affects the performance. Thus, the shape accuracy of a bonding surface needs to be increased to have a predetermined outer shape and dimension in a bonding assembly step.

In view of this, in order to make the outer shape and dimension of the hollow object into a predetermined shape and dimension, there is used a method of forming a composite material structure using a core material such as a pressurizable expandable pressure bag, a closed mold, and a thermoplastic foam material to press it outward from the interior of the hollow body (for example, see Japanese Patent Publication No. 1474023 and Japanese Patent Publication No. 3631493).

SUMMARY OF THE INVENTION

1. Technical Problem

Unfortunately, in the case of the invention disclosed in JP 1474023 and JP 3631493, the pressure bag and the thermoplastic foam material have low stiffness and poor shape stability, thus causing a problem of workability and quality stability.

Alternatively, there is a method of using an inner jig to stack a ply on an outer periphery of the inner jig, and then to translocate the ply onto the outer jig, but the method requires two kinds of jigs: an inner jig and an outer jig, thus complicating the manufacturing step. The method further causes the problems of high cost and unstable quality.

Further, when the composite material structure is formed using only the outer jig, a variation occurs in dimension inside the composite material structure. Accordingly, in order to assemble by nesting the composite material structures to each other, the inner forming surface shape of the composite material structure needs to be corrected. Unfortunately, in a place of poor accessibility, it is difficult to correct in order to improve the accuracy of the inner forming surface.

In view of such circumstances, the present invention has been developed, and an object of the present invention is to provide a composite material structure forming method capable of improving the accuracy of the shape and dimension of the composite material structure.

2. Solution to the Problem

In order to solve the above problems, the composite material structure forming method according to the present invention adopts the following solutions.

Specifically, a composite material structure forming method according to a first aspect of the present invention comprises: winding a prepreg around an inner jig; stacking a ply on the prepreg wound around the inner jig; and forming by providing an outer plate made of composite material on an outer periphery of the inner jig stacking the ply and mounting a divided outer jig thereon.

The forming method is such that after a prepreg is wound around an inner jig and a ply is stacked on the wound prepreg, an outer plate made of composite material is provided and mounted on an outer jig to form a composite material structure. Accordingly, the inner jig enables formation of the shape and dimension of the inner forming surface of the composite material structure; and the outer jig enables formation of the shape and dimension of the outer forming surface of the composite material structure. Further, it is easy to adjust the plate thickness of the composite material structure by forming it by stacking a ply on a prepreg wound around the inner jig and providing an outer plate. Thus, the composite material structure can be formed with improved shape and dimensional accuracy of the inner forming surface and the outer forming surface.

Further, a composite material structure forming method according to a second aspect of the present invention comprises: winding a prepreg around an inner jig; providing an outer plate made of composite material on an outer periphery of the prepreg wound around the inner jig and stacking a ply on the outer plate; and mounting a divided outer jig on an outer periphery of the inner jig with the ply stacked on the outer plate.

The forming method is such that a prepreg is wound around the inner jig and an outer plate made of composite material is provided on an outer periphery of the wound prepreg; and then a ply is stacked on the outer plate and mounted on the outer jig. Accordingly, the inner jig enables formation of the shape and dimension of the inner forming surface of the composite material structure; and the outer jig enables formation of the shape and dimension of the outer forming surface of the composite material structure. Further, it is easy to adjust the plate thickness of the composite material structure by providing an outer plate on a prepreg wound around the inner jig and then stacking a ply thereon. Thus, the composite material structure can be formed with improved shape and dimensional accuracy of the inner forming surface and the outer forming surface.

Further, in the composite material structure forming method according to the each aspect, the outer plate may be an uncured composite.

After an outer plate made of composite material that is uncured is provided on an outer periphery of the ply stacked on the inner jig or an outer plate made of composite material that is uncured is provided on an outer periphery of the prepreg wound around the inner jig, a ply is stacked on the outer plate. Accordingly, when a composite material structure is formed by mounting an outer jig thereon, the plate thickness of the composite material structure can be adjusted by resin flow of the outer plate. Thus, it is easier to adjust the plate thickness of the composite material structure.

3. Advantageous Effects of the Invention

After a prepreg is wound around the inner jig and a ply is stacked on the wound prepreg, an outer plate made of composite material is provided and mounted on an outer jig to form a composite material structure. Accordingly, the inner jig enables formation of the shape and dimension of the inner forming surface of the composite material structure; and the outer jig enables formation of the shape and dimension of the outer forming surface of the composite material structure. Further, it is easy to adjust the plate thickness of the composite material structure by forming it by stacking a ply on a prepreg wound around the inner jig and providing an outer plate thereon. Thus, the composite material structure can be formed with improved shape and dimensional accuracy of the inner forming surface and the outer forming surface.

DETAILED DESCRIPTION OF THE INVENTION

First Embodiment

Hereinafter, a first embodiment of the present invention will be described with reference to FIGS. 1 to 5.

Figure 1A:
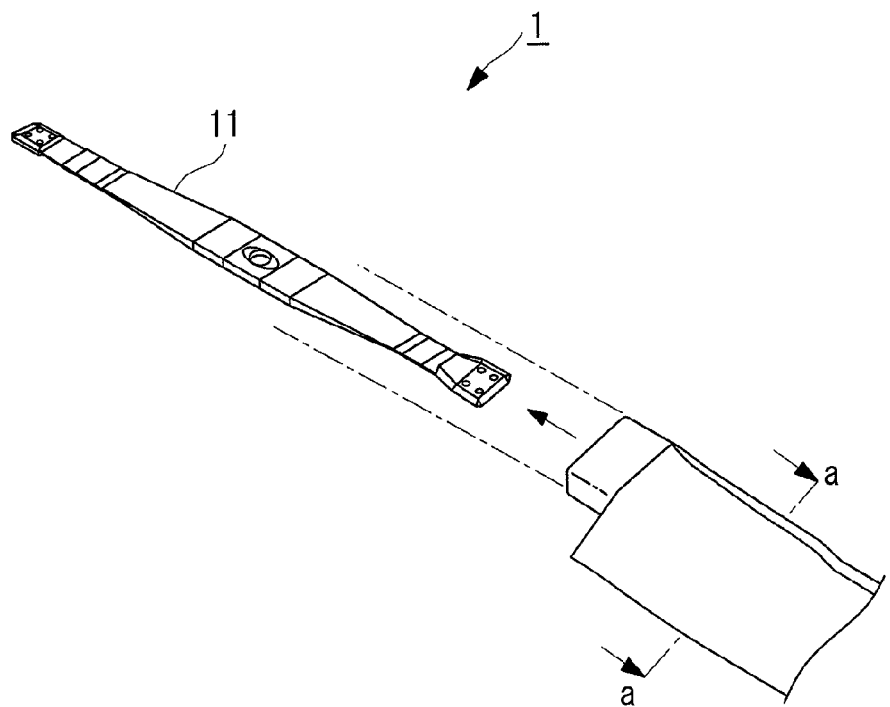
FIG. 1A is a schematic configuration view illustrating a helicopter tail rotor blade according to a first embodiment of the present invention.

FIG. 1 is a schematic configuration view illustrating a helicopter tail rotor blade 1.

The tail rotor blade (composite material structure) 1 is a hollow structure made of a composite material such as a fiber-reinforced plastic (FRP).

Figure 1B:
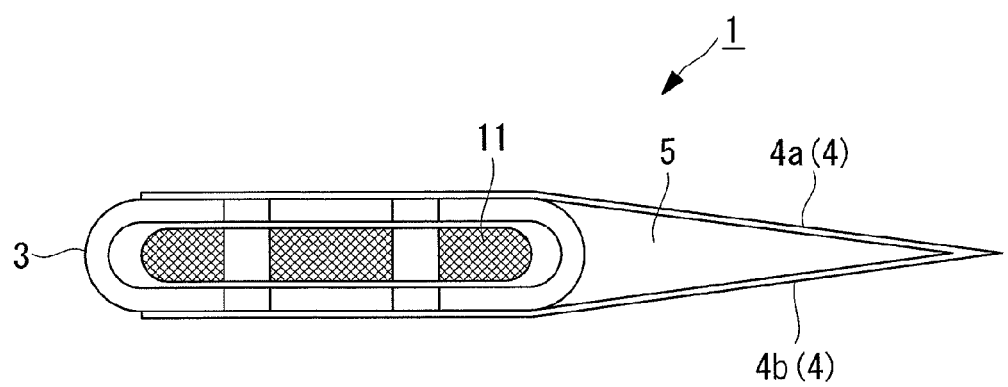
FIG. 1B is a cross-sectional view along line a-a of FIG. 1A illustrating the helicopter tail rotor blade according to the first embodiment of the present invention.

The tail rotor blade 1 includes an elastic structural member called a flex beam 11. As illustrated in FIG. 1B, the tail rotor blade 1 mainly includes a tube-shaped component called a spar 3 provided so as to cover an outer periphery of the flex beam 11; outer plates 4 which are a composite material; and a honeycomb core 5.

The flex beam 11 has a longitudinal axis in the longitudinal direction of the tail rotor blade 1 and is included in the spar 3 so as to hold the tail rotor blade 1.

The spar 3 is formed in a tube shape of a composite material mainly made of a carbon fiber-reinforced plastic (CFRP). The spar 3 has an elliptical cross-sectional shape perpendicular to the longitudinal direction of the tail rotor blade 1. The elliptical shape has a longitudinal axis in a direction (in a width direction of the spar 3) perpendicular to the longitudinal direction of the tail rotor blade 1.

The spar 3 is divided into a plurality of sections in the longitudinal direction of the tail rotor blade 1. The inner forming surface of the spar 3 is formed in a shape capable of including the flex beam 11 using an inner jig (not shown) described later. A honeycomb core 5 is provided on a trailing edge of the spar 3 (on the right side in FIG. 1B).

The honeycomb core 5 is provided on a trailing edge of the spar 3. The honeycomb core 5 has a wedge-shaped cross-sectional shape perpendicular to the longitudinal direction of the tail rotor blade 1 as illustrated in FIG. 1B. The wedge-shaped honeycomb core 5 has a tapered shape from the leading edge toward the trailing edge thereof.

The outer plates 4 are provided so as to sandwich the honeycomb core 5 and the spar 3 provided on a leading edge of the honeycomb core 5. The outer plates 4 are made of a composite material mainly made of a glass fiber-reinforced plastic (GFRP). The outer plates 4 include an upper outer plate 4a and a lower outer plate 4b which are provided such that the spar 3 and the honeycomb core 5 are interposed between the upper outer plate 4a and the lower outer plate 4b.

The upper outer plate 4a and the lower outer plate 4b are formed by means of a later described outer jig (not shown) into a wing-shaped cross-sectional shape perpendicular to the longitudinal direction of the tail rotor blade 1 by interposing the spar 3 and the honeycomb core 5 between the upper outer plate 4a and the lower outer plate 4b.

Now, the step of forming the tail rotor blade 1 will be described with reference to FIGS. 2 to 5.

Figure 2:
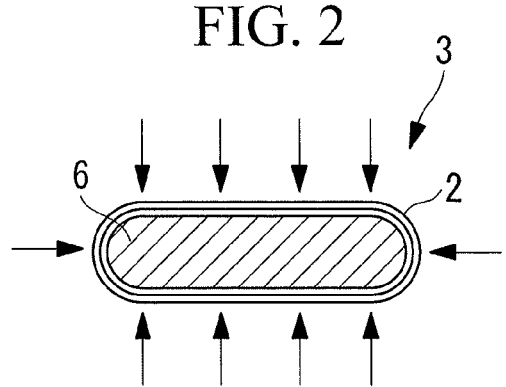
FIG. 2 is a cross-sectional view illustrating a spar curing step of the tail rotor blade illustrated in FIG. 1.
Figure 3:
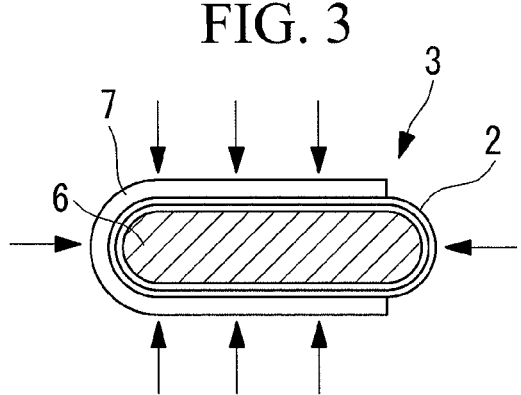
FIG. 3 is a cross-sectional view illustrating a variation of the spar curing step illustrated in FIG. 2.
Figure 4:
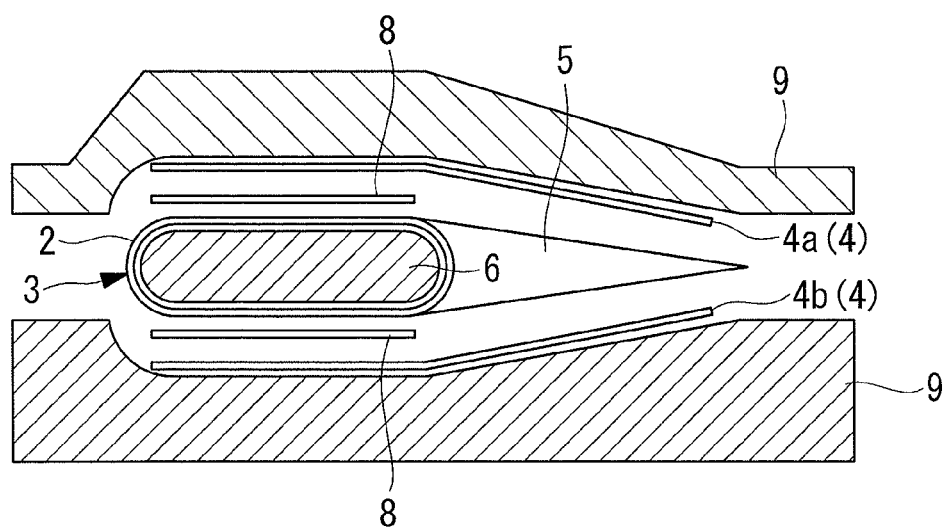
FIG. 4 is a cross-sectional view illustrating a blade curing step of the tail rotor blade illustrated in FIG. 1 or 2.
Figure 5:
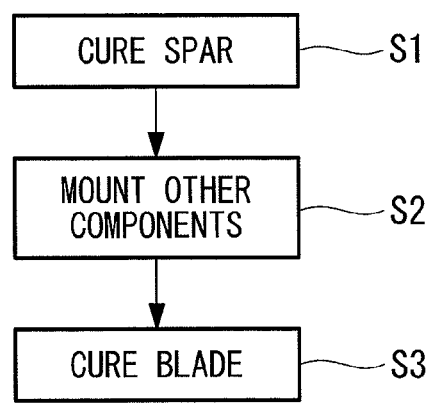
FIG. 5 is a flowchart illustrating a forming step of the tail rotor blade illustrated in FIGS. 2 to 4.

FIGS. 2 to 4 are a cross-sectional view illustrating each step of forming the tail rotor blade 1 of the present embodiment, and FIG. 5 is a flowchart illustrating the forming step illustrated in FIGS. 2 to 4.

As illustrated in FIG. 2, in a winding step of winding a prepreg 2 around an inner jig 6, the prepreg 2 is wound on an outer peripheral surface of the inner jig 6 and then the prepreg 2 is cured to form a spar 3 (step S1 in FIG. 5). Here, as illustrated in FIG. 2, the inner jig 6 has substantially the same outer peripheral surface as the inner forming surface of the formed spar 3. The inner jig 6 is made of a more rigid material than a pressure bag, a thermoplastic foam material or the like that is conventionally used to form the inner forming surface of the spar 3. For example, an aluminum alloy, an invar alloy, a composite material, and the like are used.

Alternatively, as illustrated in FIG. 3 instead of the winding step illustrated in FIG. 2, the winding step may be such that a prepreg 2 is wound on an outer peripheral surface of the inner jig 6, then an intermediate jig 7 is provided outside the prepreg 2 wound around the inner jig 6, and then the prepreg 2 is cured to form the spar 3.

Here, the inner jig 6 has the same shape as and is made of the same material as illustrated in FIG. 2. The intermediate jig 7 has substantially the same inner peripheral surface as the outer forming surface of the formed spar 3 and is provided on the outer periphery of the spar 3 extending downward from above the spar 3 through the leading edge thereof as illustrated in FIG. 3. The intermediate jig 7 is made of a less rigid material than the inner jig 6 (softer than inner jig 6).

The intermediate jig 7 having a lower rigidity than that of the inner jig 6 is used to form the spar 3, and then the intermediate jig 7 is removed. By forming the spar 3 using the inner jig 6 and the intermediate jig 7 in such a manner, the surface accuracy in the shape of the outer forming surface of the formed spar 3 can be improved in comparison with the case in FIG. 2.

Then, the plate thickness of the spar 3 formed in the winding step illustrated in FIG. 2 or 3 is measured. Based on the measurement results of the plate thickness, the number of layers of the adjustment plies (ply) is set. By adjusting the number of layers of the adjustment plies (not shown), the spar 3 is formed to have a predetermined plate thickness. This makes it possible to adjust the tail rotor blade 1 so as to have a predetermined plate thickness when later described outer plates 4 (see FIG. 4) are provided to form the tail rotor blade 1 (see FIG. 1).

Then, as illustrated in FIG. 4, the honeycomb core 5 is provided on a trailing edge side of the spar 3 (step S2 in FIG.

5). Further, the set adjustment plies 8 are stacked on an outer periphery of the prepreg 2 wound around the inner jig 6 (stacking step). The adjustment plies 8 are provided substantially parallel to the spar 3 at the top and bottom of the spar 3.

After the stacking step, the composite upper outer plate 4*a* and the lower outer plate made of composite material 4*b* are provided on the outer periphery of the inner jig 6 stacking the adjustment plies 8 and the honeycomb core 5 so as to be interposed therebetween. Further, upper and lower dividable outer jigs 9 are mounted from outside the upper outer plate 4*a* and the lower outer plate 4*b*. After the inner jig 6, the adjustment plies 8, the honeycomb core 5, the upper outer plate 4*a*, and the lower outer plate 4*b* are mounted on the outer jigs 9 in this manner, these components are cured in an autoclave to form the composite material structure (forming step, step S3 in FIG. 5).

After curing in the autoclave, the upper and lower dividable outer jigs 9 are removed. Further, the inner jig 6 is pulled out from inside the spar 3. This completes the formation of the tail rotor blade 1.

As described above, the method of forming the tail rotor blade 1 according to the present embodiment exerts the following effects.

The forming method is such that after the prepreg 2 is wound around the inner jig 6 and the adjustment plies (ply) 8 are stacked on the wound prepreg 2, the outer plates made of composite material 4 are provided and mounted on the outer jig 9. Accordingly, the inner jig 6 enables formation of the shape and dimension of the inner forming surface of the spar 3 forming the tail rotor blade (composite material structure) 1; and the outer jig 9 enables formation of the shape and dimension of the outer forming surface of the tail rotor blade 1. Further, it is easy to adjust the plate thickness of the tail rotor blade 1 by forming it by stacking the adjustment plies 8 on the prepreg 2 wound around the inner jig 6 and providing the outer plates 4 thereon. Thus, the tail rotor blade 1 can be formed with improved shape and dimensional accuracy of the inner forming surface and the outer forming surface.

Note that the foregoing description of the present embodiment has been focused on using the adjustment plies 8 to adjust the plate thickness of the tail rotor blade 1, but the present invention is not limited to this. For example, an adhesive agent may be used instead of the adjustment plies 8.

Further, the composite material structure formed by the forming method of the present invention is not limited to the helicopter tail rotor blade 1, but for example, may be applied to an aircraft blade, a windmill blade, and other blades.

Second Embodiment

The composite material structure forming method of the present embodiment is the same as that of the first embodiment except that the outer plate is an uncured composite. Thus, a description of the same configuration and step as those of the first embodiment will be omitted.

An upper outer plate (outer plate) and a lower outer plate (outer plate), provided so as to sandwich the spar and the honeycomb core, are made of an uncured composite. The upper and lower dividable outer jigs are mounted from outside the upper outer plate made of composite material that is uncured and lower outer plate and cured in the autoclave.

As described above, the method of forming the tail rotor blade (composite material structure) according to the present embodiment provides the following effects.

The forming method is such that the upper outer plate made of composite material that is uncured (outer plate) and the lower outer plate (outer plate) are provided on an outer periphery of the stacked plies (ply) which are stacked on the inner jig. Accordingly, the resin flow of the upper outer plate and the lower outer plate enables adjustment in plate thickness of the tail rotor blade (composite material structure) when it is formed by mounting the outer jig. Thus, it is easier to adjust the plate thickness of the tail rotor blade.

Note that the descriptions of the first embodiment and the second embodiment have been focused on stacking the adjustment plies 8 on the prepreg 2 wound around the inner jig 6 (see FIG. 1), but the present invention is not limited to this. For example, a configuration may be such that after the outer plates made of composite material 4 are provided on an outer periphery of the prepreg 2 wound around the inner jig 6, the adjustment plies 8 are stacked on the outer plates 4.

REFERENCE SIGNS LIST

1 composite material structure (tail rotor blade)
2 prepreg
4, 4*a*, 4*b* outer plate (upper outer plate, lower outer plate)
6 inner jig
8 ply (adjustment plies)
9 outer jig

The invention claimed is:

1. A composite material structure forming method comprising: winding a prepreg around an inner jig, wherein the inner jig does not include a pressurization mechanism which presses material surrounding the inner jig outward from an interior thereof;
   curing the prepreg wound around the inner jig, wherein the inner jig is made of a rigid material including an aluminum alloy, an invar alloy, or a composite material;
   measuring a thickness of the cured prepreg, and stacking a number of layers of a ply based on the measured thickness of the cured prepreg;
   and then
   forming a composite material structure by providing an outer plate made of composite material on an outer periphery of the cured prepreg and by mounting a divided outer jig on the outer plate,
   wherein, in said forming step, the inner jig forms a shape and dimension of an inner forming surface of the composite material structure by curing the composite material structure with heat and pressure from outside in an autoclave, and
   wherein the inner jig is removed from inside the composite material structure after said forming step.

2. A composite material structure forming method comprising: winding a prepreg around an inner jig, wherein the inner jig does not include a pressurization mechanism which presses material surrounding the inner jig outward from an interior thereof, and wherein the inner jig is made of a rigid material including an aluminum alloy, an invar alloy, or a composite material;
   curing the prepreg wound around the inner jig; and
   measuring a thickness of the cured prepreg, and stacking a number of layers of a ply
   based on the measured thickness of the cured prepreg, providing an outer plate made of composite material on an outer periphery of the cured prepreg wound around the inner jig; and forming a composite material structure by mounting a divided outer jig on an outer periphery of the cured prepreg with the ply stacked on the inner surface of the outer plate, wherein, in said stacking step, the ply are stacked on an inner surface of the outer plate, the inner surface opposing the inner jig, wherein, in said forming step, the inner jig forms a shape and dimension of an inner forming surface of the composite material structure by curing the composite material structure with heat and pressure from outside in an autoclave, and wherein the inner jig is removed from inside the composite material structure after said forming step.

3. The composite material structure forming method according to claim 1, wherein the outer plate is an uncured composite.

4. The composite material structure forming method according to claim 2, wherein the outer plate is an uncured composite.

5. The composite material structure forming method according to claim 1, wherein, in said stacking step, the ply is provided substantially parallel to a longitudinal axis of a cross section of the prepreg wound around the inner jig at a top of the prepreg, and wherein, in the cross section, a width of the prepreg wound around the inner jig is greater than a width of the ply.

6. The composite material structure forming method according to claim 2, wherein, in said stacking step, the ply is provided substantially parallel to a longitudinal axis of a cross section of the prepreg wound around the inner jig at a top of the prepreg, and wherein, in the cross section, a width of the prepreg wound around the inner jig is greater than a width of the ply.

* * * * *